W. SIMPSON.
Mirror-Holders.
No. 140,851.          Patented July 15, 1873.
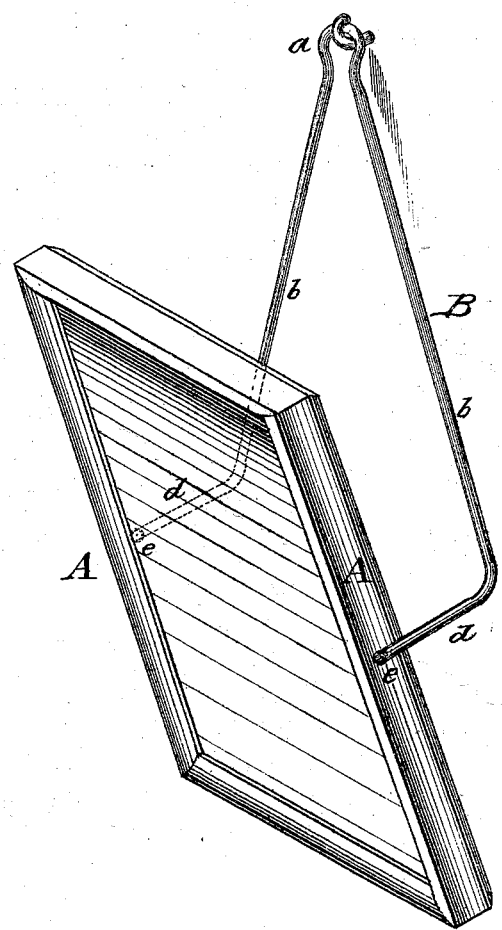

UNITED STATES PATENT OFFICE.

WILLIAM SIMPSON, OF BERLIN, CANADA.

IMPROVEMENT IN MIRROR-HOLDERS.

Specification forming part of Letters Patent No. 140,851, dated July 15, 1873; application filed March 1, 1873.

*To all whom it may concern:*

Be it known that I, WILLIAM SIMPSON, of Berlin, in the Province of Ontario and Dominion of Canada, have invented a new and Improved Mirror-Holder, of which the following is a specification:

The figure is a perspective view of my invention suspended on the wall and holding the mirror in an inclined position.

The object of my invention is to supply a neat and simple device by which a mirror may be suspended at any desirable inclination toward the wall, to suit the height of a person in shaving and for other purposes, so as to use the mirror as a toilet-glass whenever it is required. The invention consists of a V-shaped holder, of strong wire, bent forward and attached to the sides of the frame of the mirror in such a manner that the same may be inclined at pleasure.

In the drawing, A is the frame of the mirror, in the sides of which suitable holes are made for the admission of the supporter or holder B. The holder B is bent of strong wire in the shape of a reversed suspended V, with equal sides $b$ at its apex $a$, formed in the shape of a round eye, so as to be suspended to the hook driven into the wall. The legs $b$ of the holder B are bent forward under nearly a right angle, and these abutting extensions $d$ again bent toward the inside under a right angle so as to enter the holes $e$ at the sides of the frame.

The abutting parts $d$ allow of a free-and-easy motion of the mirror, its lower frame resting thereby on the wall, the mirror inclining in any position desired by the person using it. The ends of extensions $d$ may also be bent in the form of a ring and attached, by means of screws, to the frame, especially when the mirror is large and heavy, requiring greater friction to keep in place. The mirror is thereby quickly transformed into a toilet-glass; and it may be adjusted so as to reflect every part of the body.

Having thus described my invention, I claim as new and desire to secure by Letters Patent—

A wire-holder, B, having a loop-apex, $a$, equal sides $b\ b$, and extensions $d$, with end $e$, arranged and applicable as and for the purpose described.

WILLIAM SIMPSON.

Witnesses:
   C. E. PETERSON,
   ISRAEL D. BOWMAN.